(12) United States Patent
Murotani et al.

(10) Patent No.: US 7,107,332 B2
(45) Date of Patent: *Sep. 12, 2006

(54) STORAGE CONTROLLER AND COMPUTER SYSTEM FOR MANAGING INFORMATION RELATED TO CONNECTION PORT

(75) Inventors: Akira Murotani, Odawara (JP); Tetsuya Kishimoto, Odawara (JP); Akemi Sanada, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 727 days.

This patent is subject to a terminal disclaimer.

(21) Appl. No.: 09/964,069

(22) Filed: Sep. 25, 2001

(65) Prior Publication Data

US 2002/0147786 A1    Oct. 10, 2002

Related U.S. Application Data

(62) Division of application No. 09/932,240, filed on Aug. 17, 2001, now Pat. No. 7,047,290.

(30) Foreign Application Priority Data

Apr. 10, 2001    (JP) ............................. 2001-110785

(51) Int. Cl.
*G06F 15/16* (2006.01)
(52) U.S. Cl. .............................. 709/223; 714/9; 726/4
(58) Field of Classification Search ............... 709/203, 709/220–227; 713/201; 370/254; 714/9; 726/4

See application file for complete search history.

(56) References Cited

U.S. PATENT DOCUMENTS

| | | | | |
|---|---|---|---|---|
| 5,493,650 A | * | 2/1996 | Reinke et al. .............. 709/225 |
| 5,625,621 A | * | 4/1997 | Christensen et al. ........ 370/248 |
| 5,737,319 A | * | 4/1998 | Croslin et al. .............. 370/255 |
| 5,796,736 A | * | 8/1998 | Suzuki ....................... 370/254 |
| 5,805,800 A | * | 9/1998 | Kotani et al. ............... 713/200 |
| 6,012,100 A | * | 1/2000 | Frailong et al. ............ 709/250 |
| 6,301,612 B1 | * | 10/2001 | Selitrennikoff et al. ..... 709/220 |
| 6,557,033 B1 | * | 4/2003 | Maeda ........................ 709/223 |
| 6,681,248 B1 | * | 1/2004 | Sears et al. ................. 709/223 |
| 6,845,395 B1 | * | 1/2005 | Blumenau et al. .......... 709/223 |
| 2005/0050191 A1 | * | 3/2005 | Hubis ......................... 709/223 |

FOREIGN PATENT DOCUMENTS

| | | |
|---|---|---|
| EP | 0881560 A2 | 12/1998 |
| JP | 10-333839 | 12/1998 |

* cited by examiner

*Primary Examiner*—Patrice Winder
*Assistant Examiner*—Benjamin A. Ailes
(74) *Attorney, Agent, or Firm*—Townsend and Townsend and Crew LLP

(57) ABSTRACT

A storage controller determines a difference between a control table containing fiber channel port configuration of an upper node device and security information, and information fetched from a name server, thereby detecting replacement of a fiber channel port and correcting the control table. This enables data input/output in the same way as before fiber channel port replacement without consciously modifying the security information.

11 Claims, 6 Drawing Sheets

FIG. 3

EXTENDED LINK SERVICE USED FOR SECURITY INFORMATION MANAGEMENT

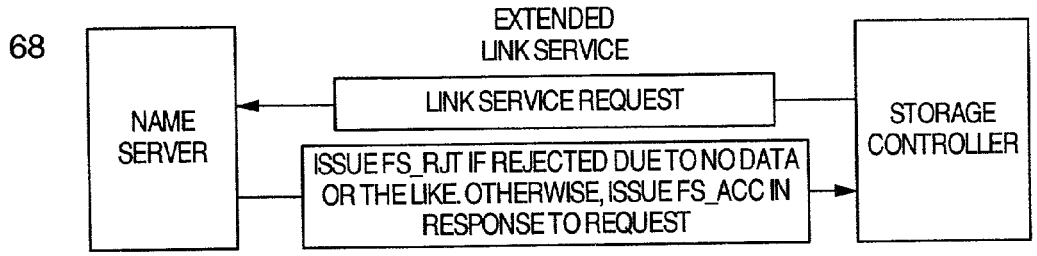

69  GNN_FT (GET NODE NAME BY FC-4 TYPE) REQUEST PAYLOAD

| BYTE\BIT | 0      7 | 8      15 | 16      23 | 24      31 |
|---|---|---|---|---|
| 0-3 | RESERVED | DOMAIN_ID | AREA_ID | FC-4 TYPE |

FC-4 TYPE: 08h IN SCSI

FS_ACC ACCEPT PAYLOAD

| BYTE\BIT | 0     7 | 8     15 | 16     23 | 24     31 |
|---|---|---|---|---|
| 0-3 | RESERVED | PORT_ID #1 | | |
| 4-7 | RESERVED | | | |
| 8-11 | PORT NAME #1 | | | |
| 12-15 | | | | |
| 16-19 | CONTROL | PORT ID #2 | | |
| 20-23 | RESERVED | | | |
| 24-27 | PORT NAME #2 | | | |
| 28-31 | | | | |
| : | : | | | |

70  GPN_ID (GET PORT NAME BY PORT ID) REQUEST PAYLOAD

| BYTE\BIT | 0     7 | 8     15 | 16                 31 |
|---|---|---|---|
| 0-3 | RESERVED | PORT_ID (24 BIT) | |

FS_ACC ACCEPT PAYLOAD

| BYTE\BIT | 0              15 | 16              31 |
|---|---|---|
| 0-3 | PORT_NAME (64 BIT) | |
| 4-7 | | |

71  GNN_ID (GET NODE NAME BY PORT ID) REQUEST PAYLOAD

| BYTE\BIT | 0     7 | 8     15 | 16                 31 |
|---|---|---|---|
| 0-3 | RESERVED | PORT_ID (24 BIT) | |

FS_ACC ACCEPT PAYLOAD

| BYTE\BIT | 0              15 | 16              31 |
|---|---|---|
| 0-3 | NODE_NAME (64 BIT) | |
| 4-7 | | |

DATA TRANSFER SEQUENCE EXAMPLE

SEQUENCE FOR CHECKING PORT NAME IN PAYLOAD

STORAGE CONTROLLER AND COMPUTER SYSTEM FOR MANAGING INFORMATION RELATED TO CONNECTION PORT

The present application is a divisional of application Ser. No. 09/932,240, filed Aug. 17, 2001, now U.S. Pat. No. 7,047,290.

BACKGROUND OF THE INVENTION

1. Field of the Invention

The present invention relates to a computer system including a storage device capable of managing security information and in particular to technique for automatically reflecting modification of managed information caused by replacement of an error component of an upper node device or the like to the security information.

2. Description of the Related Art

Technique of security for access to a storage controller from an upper node device is disclosed, for example, in JP-A-10-333839 (corresponding to EP 0 881 560 A2) which provides a storage device having the security function to prevent an unauthorized access from an upper node device by setting port name information for uniquely identifying an upper node device in the storage controller, so as to be compared with port name information stored in a frame sent from the upper node device, thereby determining whether the access is allowed.

However, according to the technique disclosed in JP-A-10-333839, when an interface component of the upper node device is replaced with a new one and a port name before the replacement is changed to a different port name after the replacement, it becomes impossible to access the new port name after the replacement due to security information set in the storage controller. For this, it is necessary to correct the security setting on the storage device after the replacement. Since a fiber channel can connect an upper node device to a storage controller via fabric, the upper node device may be at a distance from the storage controller. Accordingly, replacement of an interface component of the upper node device should be enabled without depending on the setting of the storage controller.

Moreover, since the port name is used as an identifier of the upper node device, security setting depending on an upper node device has been impossible when the upper node device has a plurality of fiber channel ports.

SUMMARY OF THE INVENTION

It is therefore an object of the present invention to provide a computer system including an upper node device having a connection port, an information exchange device connected to the connection port and controlling packet transfer, and a storage controller connected to the information exchange device and sending/receiving a packet to/from the upper node device via the information exchange device.

The storage controller has a control table containing connection port identification information and connection port security information. The control table may be created for each of the upper node device or the control table may further contain identification information of the upper node device. The storage controller detects replacement of the connection port according to information obtained from the information exchange device. When a replacement of the connection port is detected, the connection port identification information in the control table is replaced by new connection port identification information after the replacement.

Thus, according to the present invention, the security information of the connection port before replacement can be retained in the security information of the connection port after the replacement.

Moreover, when a node name is contained as the security information, for an upper node device having a plurality of fiber channel ports, it is possible to set security depending on the upper node device.

BRIEF DESCRIPTION OF THE DRAWINGS

FIG. 3 shows an I/O specification of a standard extended link service capable of providing attribute information concerning a fiber channel port to be managed by the embodiment.

FIG. 6 shows a control table correction sequence according to the embodiment when a fiber channel port is replaced or the like.

DESCRIPTION OF THE EMBODIMENTS

Firstly, referring to FIG. 1, explanation will be given on interface of a fiber channel according to the present invention and a storage device using the fiber channel interface.

Figure 1:
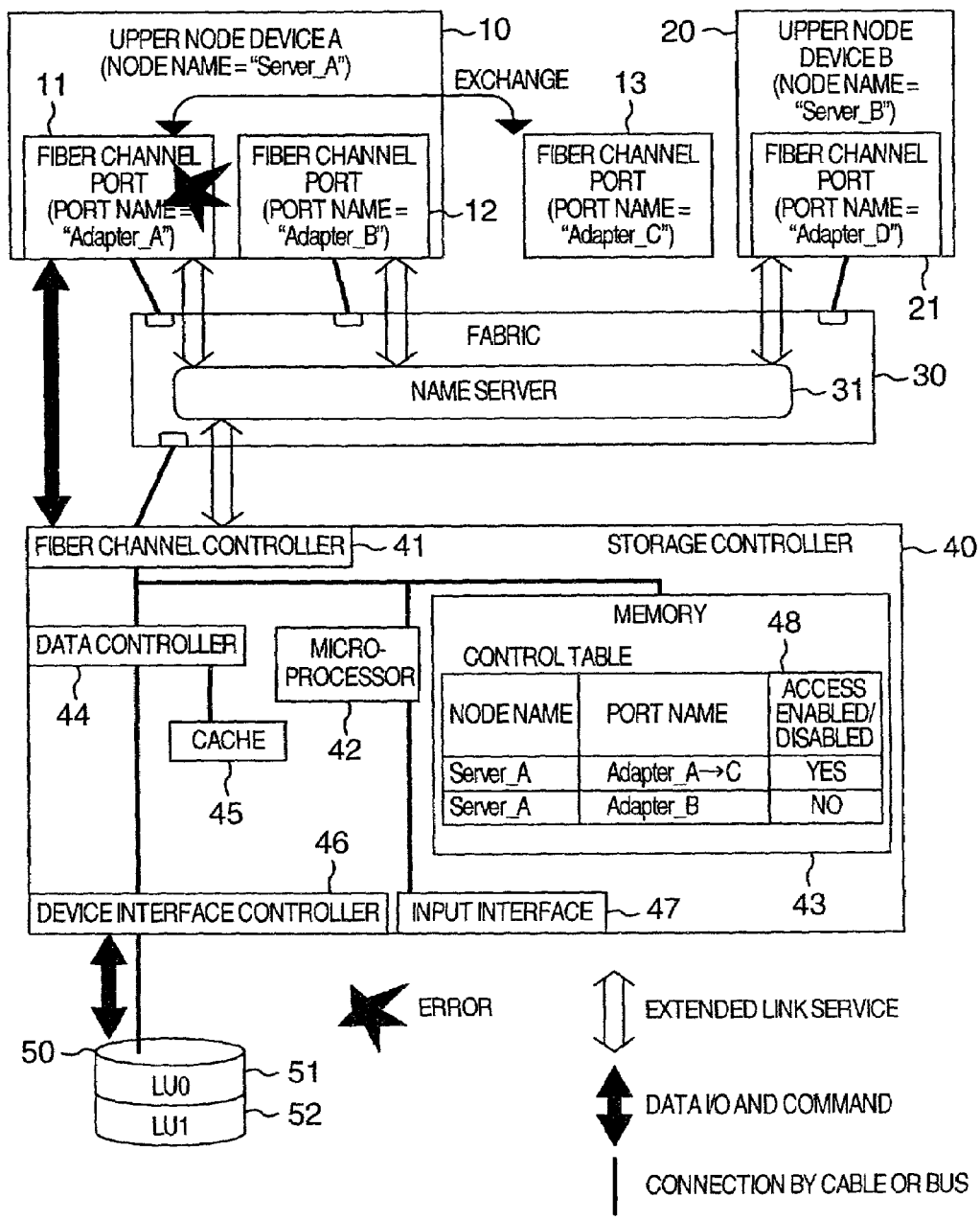
FIG. 1 shows system configuration according to an embodiment of the present invention.

FIG. 1 shows a configuration example of a storage system using a disk array as a storage controller. In FIG. 1, reference numerals 10 and 20 denote upper-node devices as CPU's for performing data processing. Each of the upper node device 10, 20 has fiber channel ports 11, 12 and 21. A fiber channel port 13 is for replacement and is not mounted on the upper node device 10 or 20. Each of the fiber channel ports 11, 12, 13 and 21 has a port name as an identifier for uniquely identifying the corresponding fiber channel port. Each of the upper node devices 10 and 20 has a node name as an identifier for uniquely identifying the corresponding upper node device. The reference numeral 40 denotes a storage controller of a disk array according to the present invention. The storage controller 40 is connected via a fabric 30 to the fiber channel ports 11 and 12 of the upper node device 10 and the fiber channel port 21 of the upper node device 20. The fabric 30 has the function of the name server 31 defined in the fiber channel standard specification for collecting and providing attribute information of the devices connected to the fabric 30, using an extended link service.

The storage controller 40 includes: a fiber channel controller 41 performing data transfer to/from the upper node devices 10 and 20 and the extended link service with the name server 31; a microprocessor 42 controlling the entire storage controller; a memory 43 saving a micro-program controlling operation of the controller and control data; a data controller 44 controlling data read and write from/to a cache; a cache 45 for temporarily buffering write data and read data from a disk drive; a device interface controller 46 controlling data transfer to/from the disk drive; and an input interface 47 for entering access security information.

A control table 38 for realizing the present invention is creased on the memory 43. The control table 38 contains fiber channel port configuration of the uppernode devices together with the security information. The control table 38 is used to determine whether an access to the upper node device is to be allowed and to detect replacement of the fiber channel port. Accordingly, the control table 38 is preferably saved in a non-volatile region.

The reference numeral 50 denotes a disk array under the control by the storage controller 40. The disk array 50 is a device for storing data of the upper node device and includes a plurality of disk drives arranged so as to have redundancy. The disk array 50 is logically divided into a plurality of domains LU as SCSI access unit of the upper node device. In the present embodiment, the disk array 50 shows an example when having two domains LU0 (51) and LU1 (52).

Figure 2:
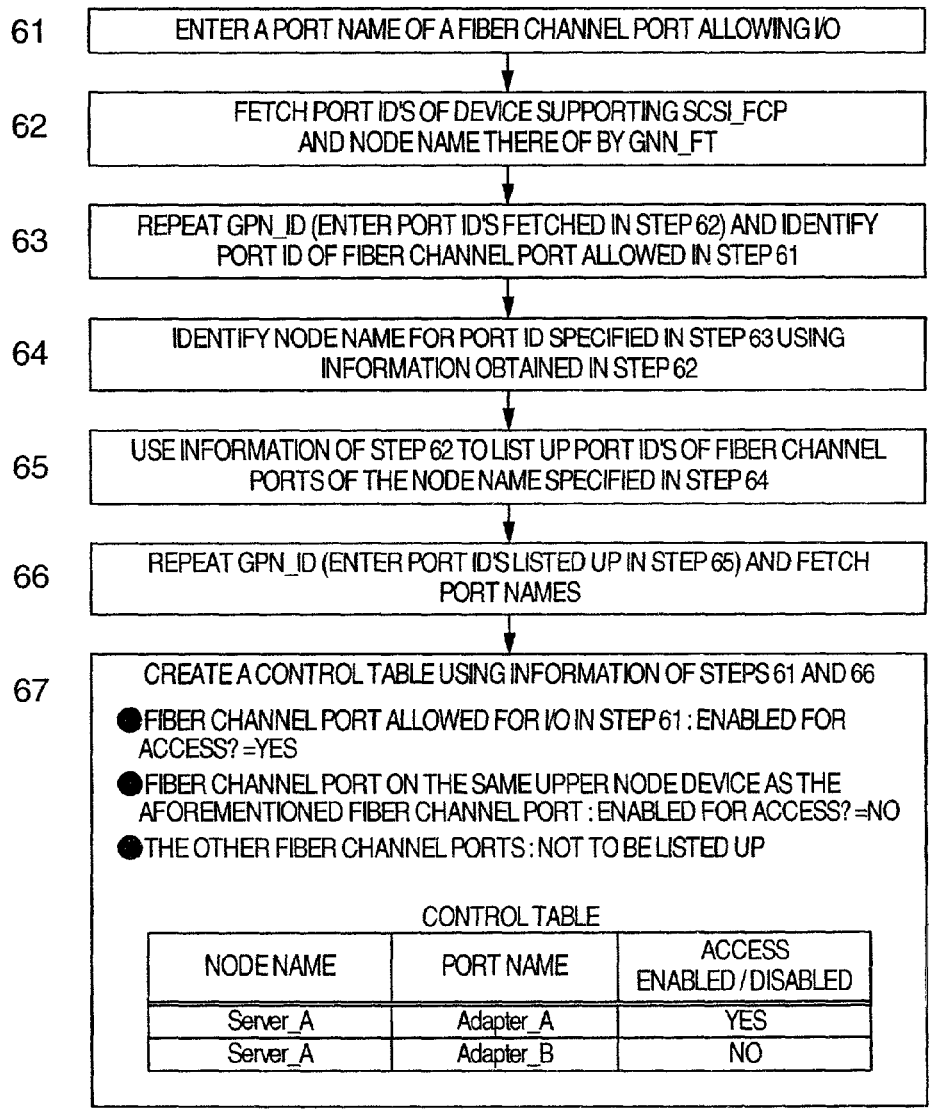
FIG. 2 shows a sequence for creating a control table required by the embodiment.

Referring to FIG. 2 and FIG. 3, explanation will be given on a sequence for creating a control table from a user input by the storage controller 40. In the example below, the security information uses a 64-bit port name for a fiber channel port which can be uniquely identified. In step 61, a user uses the input interface 47 to enter a port name of the fiber channel port of the upper node device which authorizes I/O. Upon reception of the user input, in step 62, the storage controller 40 issues a link service request GNN_FT (Get Node Name by FC-4 Type) to the name server 31.

The name server 31 manages devices connected to the fabric in fiber channel port basis and returns FS_RJT or FS_ACC in response to the link service request as shown in 68 in FIG. 3. Normally, when node name information is referenced for a fiber channel port, a node name of the upper node device to which the fiber channel port belongs is indicated.

GNN_FT uses an I/O format shown in 69 in FIG. 3. GNN_FT is a link service for identifying the fiber channel port supporting a particular FC-4 Type among the devices connected to the fabric under management of the name server and returning its port ID and node name by FS_ACC.

In case of SCSI, 08h is specified to the FC-4 type.

Thus, in step 62, the storage controller 40 can fetch the port ID and the node name of the fiber channel port of the device supporting the SCSI. Next, in step 63, the storage controller 40 issues a link service request GPN_ID (Get Port Name by Port ID) to the name server 31. The GPN_ID has an I/O format shown in 70 in FIG. 3. The GPN_ID is a link service referencing the port name by the Port ID. In step 63, the storage controller 40 repeats the GPN_ID using the port ID's fetched in step 62 and identifies the Port ID of the fiber channel port allowed for I/O by the user in step 61.

In step 64, the storage controller 40 uses the information fetched in step 62 to identify the node name of the fiber channel port allowed for I/O by the user in step 61 and then in step, using the sequence of steps 65 and 66, the information fetched in step 62 is used to identify port names of all the fiber channel ports of the upper node device specified by that node name. In step 67, the storage controller 40 adds security information to the port name information fetched in step 66 so as to constitute the fiber channel port configuration information of the upper node device, thereby creating a control table 48. In step 67, an example is given for a case when an access is allowed only to the fiber channel port 11 among the fiber channel ports of FIG. 1.

Next, an example will be given on a data transfer by the upper node device 10 via the storage controller 40 with the disk array 50 where I/O security is applied using the control table 48.

Figure 4:
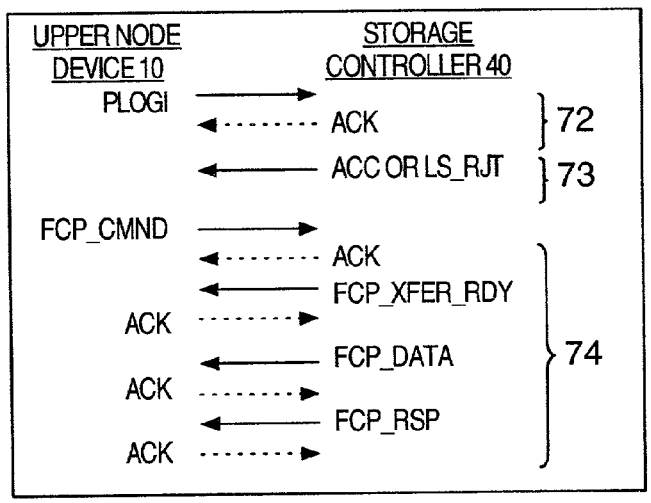
FIG. 4 shows a data transfer sequence of an ordinary fiber channel.

FIG. 4 shows a sequence performed by the upper node device 10 to the storage controller 40. In 72, the upper node device 10 issues a link service request of PLOGI (port log in) to the storage controller 40. For negotiation of various parameters required for data transfer, a parameter of the upper node device 10 is presented to a payload of PLOGI. If data transfer is enabled, in 73, the parameter of the storage controller 40 is transferred to the upper node device 10 by the ACC payload. If the data transfer is disabled, in 73, LS_RJT is returned to the upper node device 10. When the PLOGI is responded by ACC, a SCSI command as shown in 74 is issued as a data frame from the upper node device 10 to the storage controller 40. 74 shows an example of read.

The SCSI command in the data frame received by the fiber channel controller 41 is fetched and analyzed by the micro processor 42, and a data read request is issued via the device interface controller 46 to the disk array 50. When the data is stored in the cache 45 via the data interface controller 46 and the data controller 44, the micro processor 42 reports a data transfer start to the upper node device 10 using a data frame FCP_XFER_RDY. Data transfer is performed using a data frame FCP_DATA and status transfer is performed using a data frame FCP_RSP, thereby completing access.

Figure 5:
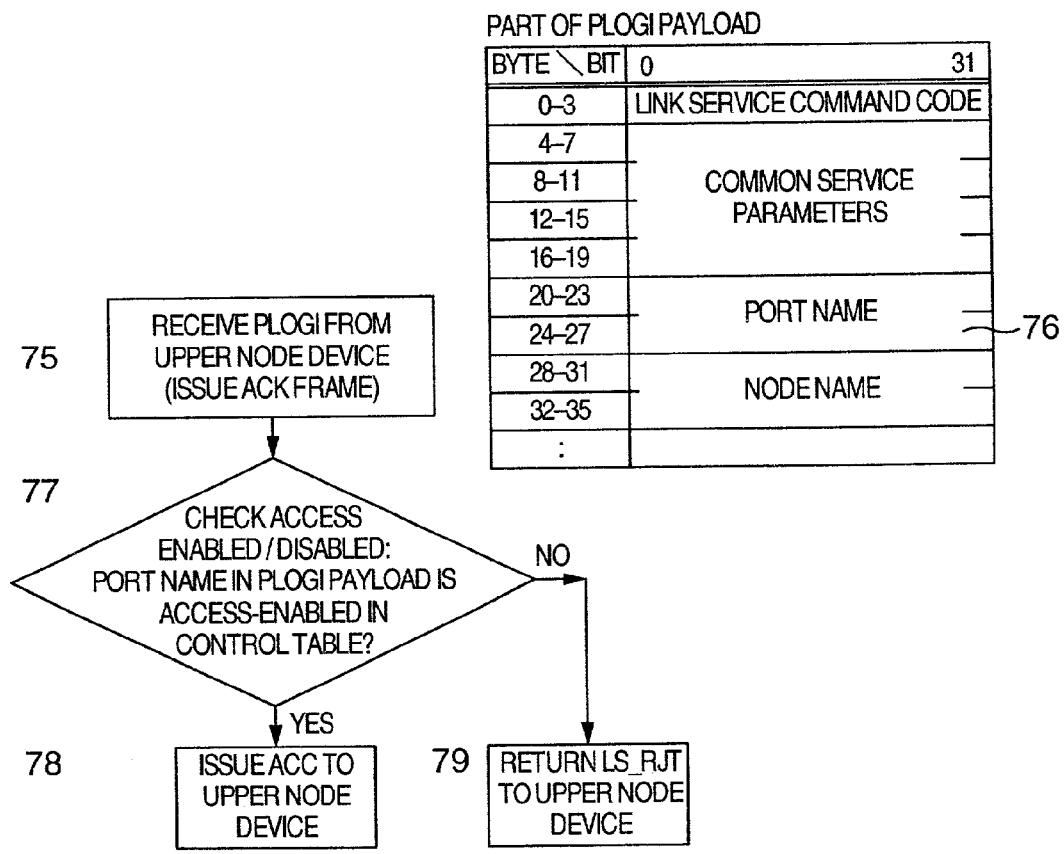
FIG. 5 shows a decision sequence when allowing an I/O request according to the embodiment.

Here, when the security setting of 67 in FIG. 3 is performed, if the upper node device 10 accesses via the fiber channel port 11, data transfer is performed but if the access is made via the fiber channel port 12, no data transfer is performed. For this, the storage controller 40 performs a sequence shown in FIG. 5 upon reception of PLOGI. In step 75, upon reception of PLOGI in step 75, the storage controller 40 fetches the port name of step 76 and compares it with the control table in step 77. If this port name can be accessed according to the control table, ACC is issued in step 78 to report that the upper node device 10 can be accessed. If the port name is disabled to be accessed in the control table or if the port name is not loaded in the control table, LS_RJT is issued in step 79 so as to report that the upper node device 10 cannot be accessed. Thus, security is assured for access to the upper node device according to the present invention.

Next, explanation will be given on an automatic correction technique according to the present invention used when correction of the control table 48 is required due to replacement of a fiber channel port. In FIG. 1, for example, the fiber channel port 11 and the fiber channel port 13 with a port name Adapter_C are replaced.

Correction of the control table 48 is performed when the storage controller 40 has received RSCN (registered state change notification) extended link service issued from the fabric 30. When a connection state of each of the fiber channel ports of the devices connected to the fabric 30 is changed, the RSCN is reported with the port ID of the fiber channel port to the respective devices. A plurality of port ID's may also be used.

Figure 6:
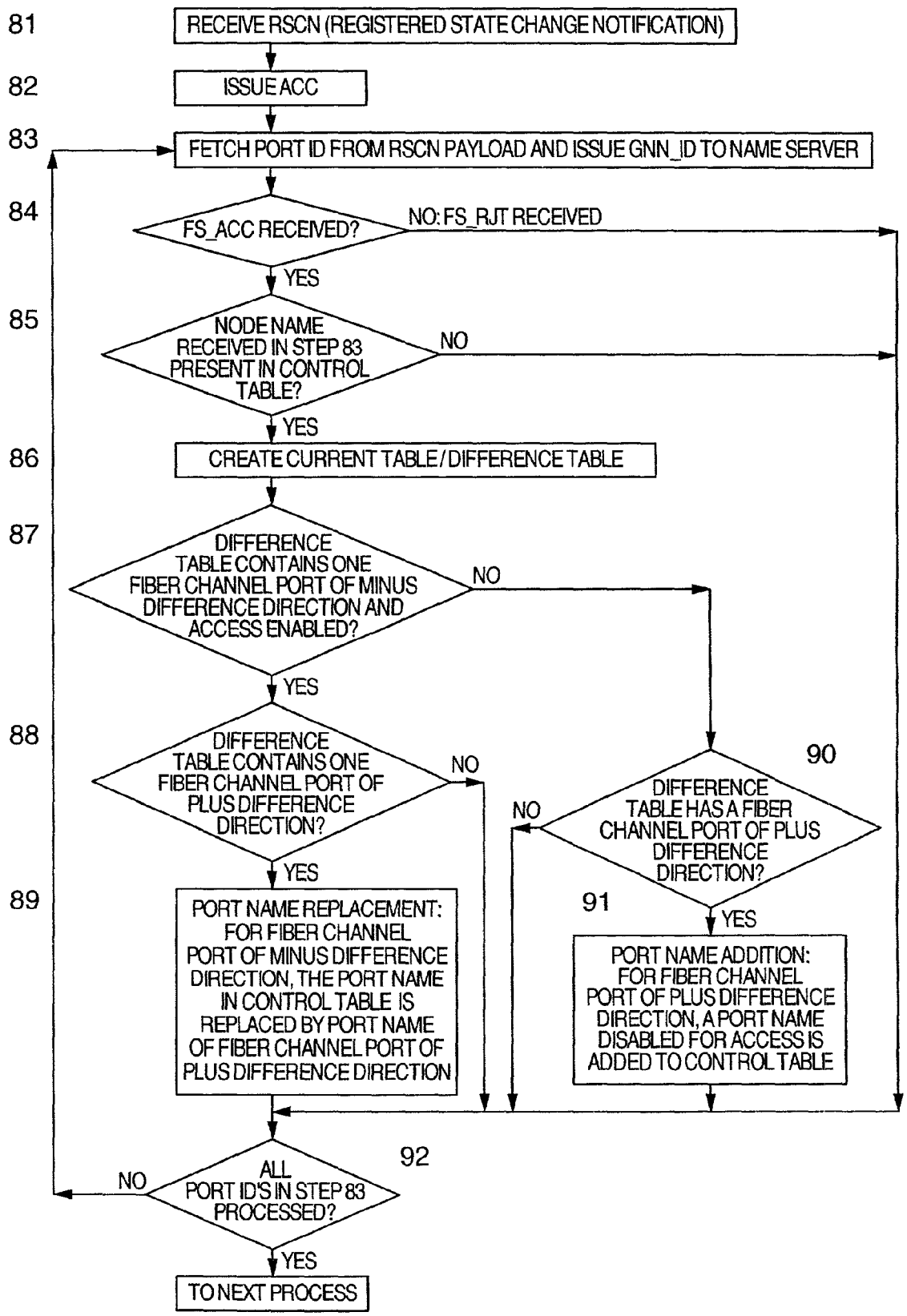

FIG. 6 shows a control table correction sequence of the storage controller 40 which has received the RSCN. GNN_ID in step 83 is an extended link service indicating the format in 71 of FIG. 3 and the node name can be referenced from the port ID. Firstly, when the fiber channel port 11 is disconnected from the fabric 30 for replacement, the fabric 30 detects the disconnection and issues the RSCN to all the devices connected to the fabric 30. In step 83, the storage controller 40 issues GNN_ID with the port ID fetched from the RSCN payload but since fiber channel port 11 is deleted from the information in the name server 31, the storage controller 40 receives FS_RJT in step 84, thereby terminating the sequence of FIG. 6 without performing anything.

Next, the when fiber channel port 13 is loaded on the upper node device 10 and connected to the fabric 30, the RSCN is issued from the fabric 30 and accordingly, the storage controller 40 again performs the process sequence of FIG. 6. The node name fetched in step 83 is the one for the upper node device 10 for which the fiber channel port has been replaced and is contained in the control table 48. Accordingly, the process proceeds from step 85 to step 86.

Figure 7:
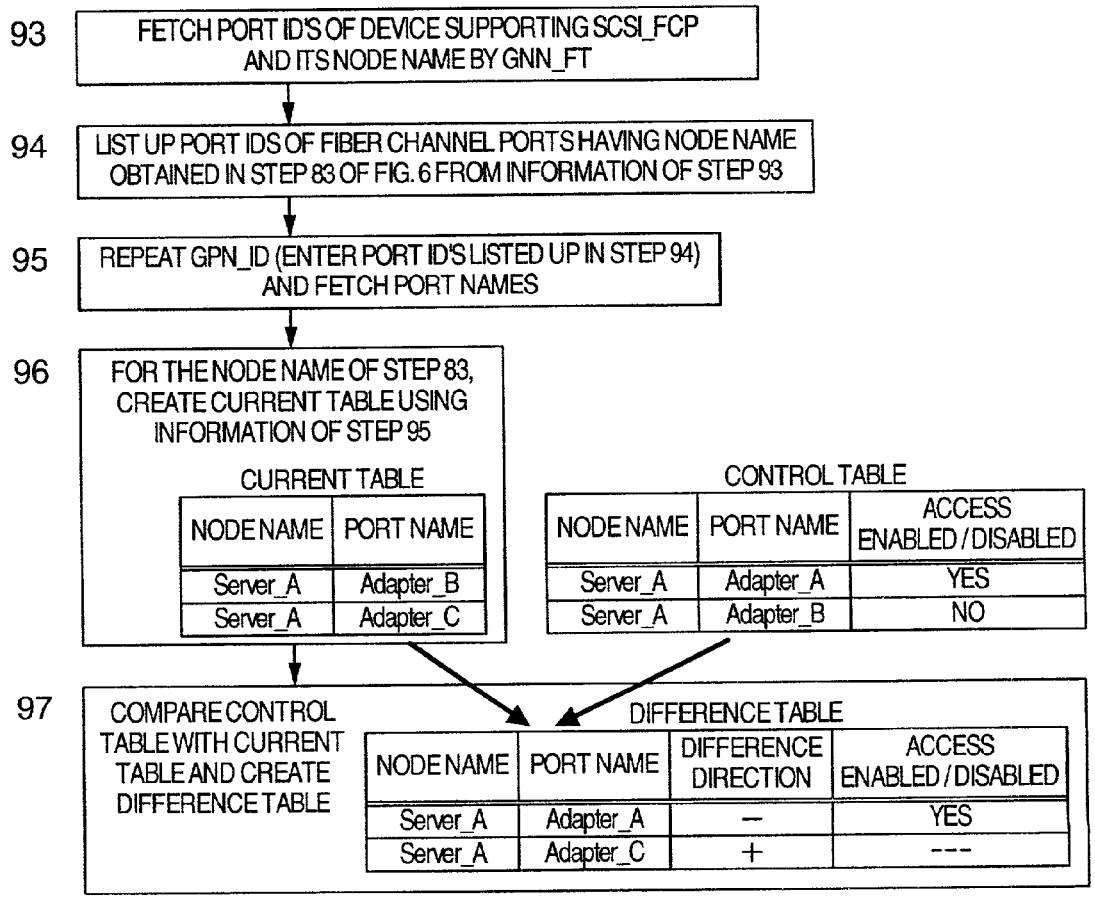
FIG. 7 shows a detection sequence detecting a fiber channel port replaced according to the embodiment.

FIG. 7 shows a current table/difference table creation sequence in step 86. In order to create a list of port names of fiber channel ports present on the current upper node device 10, the storage controller 40 issues GNN_FT in step 93, and fetches the port ID's of the fiber channel ports present on the upper node device 10 in step 94 and converts the port ID's into port names in step 95. A difference between the current table created in step 96 and the control table, to which the security information is added so as to create the difference table shown in step 97. In the example shown in step 97, the difference direction of the fiber channel port 11 is minus and the difference direction of the fiber channel port 13 is plus in the difference table.

Returning to FIG. 6, explanation on the correction technique of the control table will be continued. The fiber channel port having a minus difference direction and enabled for access indicates that the fiber channel port for which access is allowed is not operating. The fiber channel port having a plus difference direction indicates that a new fiber channel port is added to replace the fiber channel port not operating.

In the sequence of FIG. 6, step 87 and step 88 identifies the fiber channel port before the replacement and the fiber channel port after the replacement, and step 89 corrects the port name on the control table. In step 89, for the fiber channel port having the minus direction difference, the port name is replaced by the port name of the fiber channel port having the plus direction difference.

Moreover, when no fiber channel port having the minus direction difference is present (in sequence 90 of FIG. 6) but a fiber channel port having the plus direction difference is present, this means that an additional fiber channel port is placed. In this case, in 91 of FIG. 6, a port name is added in the control table together with the access disabled attribute, so as to eliminate trouble during fiber channel port replacement.

Here, if the upper node device should be stopped when adding a fiber channel port, after the fiber channel port is added, upon start of the upper node device, the start order of the fiber channel ports may not be determined and the fiber channel port to be added may be identified as the fiber channel port after the replacement. However, this can be eliminated by starting the upper node device without connecting the fiber channel port to be added, to the fabric, or by applying a history method to the port name correction in step 89 of FIG. 6.

Further, it is possible to provide a storage controller enabling finer security management by assuming storage domains correlating each of resources such as a plurality of LUs managed by the storage controller and a plurality of fiber channel controllers and by having a control table for each of the storage areas.

Furthermore, by accepting a node name as the security information input and allowing all the data I/O received from this node name, the upper node device having a plenty of fiber channel ports can reduce the steps required for checking and setting the respective fiber channel ports identifiers.

Accordingly, when a node name is contained in the security information, it is possible to perform security setting depending on an upper node device when the upper node device has a plurality of fiber channel ports.

As has been described above, the storage controller 40 receives a port name input of a fiber channel port of an upper node device and has the port name list of the fiber channel ports of the upper node device for each of the node names of the upper node device and the control table containing the I/O enabling/disabling information, so that a node name which can be fetched from the fabric is compared to the port name list, thereby detecting a fiber channel port replacement of the upper node device. In the control table, the port name of the fiber channel port replaced is rewritten by the port name of the fiber channel port after the replacement. Thus, the upper node device can perform data I/O for the storage controller in the same way as before the fiber channel port replacement.

According to the present invention, for a storage controller connected to a fabric and supplied with a fiber channel port identifier as security information, when a fiber channel port of the upper node device is replaced, data I/O can be performed in the same way as before a fiber channel port replacement without consciously modifying the security information.

What is claimed is:

1. A storage controller comprising:
    a control portion connected to fabric connected to a fiber channel port contained in an upper node device, wherein the control portion passes a packet via the fabric with the upper node device; and
    a control table containing a node name of the upper node device, a port name of the fiber channel port, and a fiber channel port access enabled/disabled state, and when connection status of the fiber channel port was changed in the upper node device, replacement of the fiber channel port is detected by the storage controller on the basis of information notified from the fabric, and the port name of the fiber channel port in the control table is replaced with a port name of a new fiber channel port replacing the fiber channel port before the replacement, and in case that the port name of the fiber channel port before replacement was access enabled, a port name of the fiber channel after replacement is set to be access enabled in the control table, and for a newly added fiber channel port, a node name of corresponding upper node device, a port name of a fiber channel port of the newly added fiber channel port and security information in which access disabled is set are registered in the control table; and
    wherein said security information is added to the port name information so as to constitute the fiber channel port configuration information of the upper node device.

2. The storage controller as claimed in claim 1, wherein the storage controller detects a node name of the upper node device whose connection state to the fiber channel port is changed, detects a port name of a fiber channel port to be connected to the upper node device of that node name, compares the detected port name with the port name contained in the control table, and if a first port name is not detected but stored and a second port name is detected but not stored, then detects that the fiber channel port of the first port name is replaced by the fiber channel port of the second port name.

3. The storage controller as claimed in claim 1, wherein the control table is provided for each of the upper node devices.

4. The storage controller as claimed in claim 1, wherein when a port name of a fiber channel port allowing access is entered, a node name of the upper node device to which the fiber channel port allowing access is to be connected is detected, a port name of the fiber channel port to be connected to the upper node device of that node name is detected, and the control table is created containing the node name, the port name, and the entered access enabled/disabled information.

5. The storage controller as claimed in claim 1, wherein interface between the upper node device and the storage controller is a fiber channel standardized by ANSI X3T11.

6. The storage controller as claimed in claim 1, wherein a storage device having a plurality of storage domains is connected to the storage controller and the access enabled/disabled management is performed for each of the storage domains and each of the fiber channel ports.

7. A computer system comprising:
at least one upper node device each having at least one fiber channel port;
a fabric connected to the fiber channel port for controlling packet transfer; and
a storage controller for passing a packet via the fabric with the upper node device, wherein the storage controller has a control table containing a node name of the upper node device, a port name of the fiber channel port, and an access enabled/disabled state of the fiber channel port, and when connection status of the fiber channel port was changed in the upper node device, replacement of the fiber channel port is detected by the storage controller on the basis of information notified from the fabric, and the port name of the fiber channel port in the control table is replaced with a port name of a new fiber channel port replacing the fiber channel port before the replacement, and in case that the port name of the fiber channel port before replacement was access enabled, a port name of the fiber channel after replacement is set to be access enabled in the control table, and for a newly added fiber channel port, a node name of corresponding upper node device, a port name of a fiber channel port of the newly added fiber channel port and security information in which access disabled is set are registered in the control table; and
wherein said security information is added to the port name information so as to constitute the fiber channel port configuration information of the upper node device.

8. The computer system as claimed in claim 7, wherein the storage device detects the node name of the upper node device where the fiber channel port connection state has been changed, detects a port name of the fiber channel port to be connected to the upper node device having the node name, and compares the detected port name with the port name contained in the control table, and if the control table contains a first port name not detected and does not contain a second port name detected, it is detected that the fiber channel port of the first port name is replaced by the fiber channel port of the second port name.

9. The computer system as claimed in claim 7, wherein the control table is provided for each of the upper node devices.

10. The computer system as claimed in claim 7, wherein when a port name of a fiber channel port allowing access is entered, the storage controller detects a node name of the upper node device to which the fiber channel port allowing access is to be connected, detects a port name of the fiber channel port to be connected to the upper node device of the node name, and creates the control table having the node name, the port name, and access enabled/disabled information input.

11. The computer system as claimed in claim 7, wherein interface between the upper node device and the storage controller is a fiber channel standardized by ANSI X3T11.

* * * * *